United States Patent [19]

Koshizuka et al.

[11] Patent Number: 5,534,372
[45] Date of Patent: Jul. 9, 1996

[54] IC CARD HAVING IMAGE INFORMATION

[75] Inventors: Kunihiro Koshizuka; Shigehiro Kitamura; Masataka Takimoto; Tomonori Kawamura, all of Hino, Japan

[73] Assignee: Konica Corporation, Japan

[21] Appl. No.: 279,997

[22] Filed: Jul. 25, 1994

[30] Foreign Application Priority Data

Jul. 28, 1993 [JP] Japan ................................. 5-186253

[51] Int. Cl.⁶ .............................................. G03F 7/11
[52] U.S. Cl. ............................ 430/10; 430/11; 430/14; 430/17; 235/380; 361/737
[58] Field of Search ............................ 430/10, 11, 14, 430/17; 361/737; 235/380; 264/272.17

[56] References Cited

U.S. PATENT DOCUMENTS 4,894,110   1/1990  Lass et al. ................................. 430/10
5,173,840  12/1992  Kodai et al. ............................. 361/737

FOREIGN PATENT DOCUMENTS 0431493   6/1991  European Pat. Off. .
4336286  11/1992  Japan .
516540    1/1993  Japan .
5155191   6/1993  Japan .
WO92/21105 11/1992  WIPO .

OTHER PUBLICATIONS

Patent Abstracts of Japan: vol. 13, No. 446, Diesele KiKi Co. Ltd., O. Masao, et al, Card–Shaped Storage Body.
Patent Abstracts of Japan: vol. 17, No. 212, I. Naoki, et al, Heat–Sensitive Recording . . . Thereof.
Patent Abstracts of Japan: vol. 17, No. 56, N. Atsushi, et al. Image Recording Material . . . Thereof.
European Patent Office Abstract, Derwent Publications Ltd., Nitto Denko Corp. Reversible Heat–Sensitive Recording . . . Substrate.

*Primary Examiner*—Charles L. Bowers, Jr.
*Assistant Examiner*—Christopher G. Young
*Attorney, Agent, or Firm*—Jordan B. Bierman; Bierman and Muserlian

[57] ABSTRACT

An IC card in which an IC chip is incorporated between a first and second base boards, comprises an image receiving layer on which an ink image is transferred by a thermal transfer method and a cushion layer provided between the IC chip and the image receiving layer so that the cushion layer smooths irregularity caused by the IC chip and improves a flatness of the image receiving layer.

14 Claims, 3 Drawing Sheets

PRIOR ART

FIG. 5

IC CARD HAVING IMAGE INFORMATION

BACKGROUND OF THE INVENTION

The present invention relates to an IC card in which image information is formed on a surface of the base board having ICs, and more particularly relates to an IC card having image information of high quality formed by means of thermal transfer.

Figure 4:
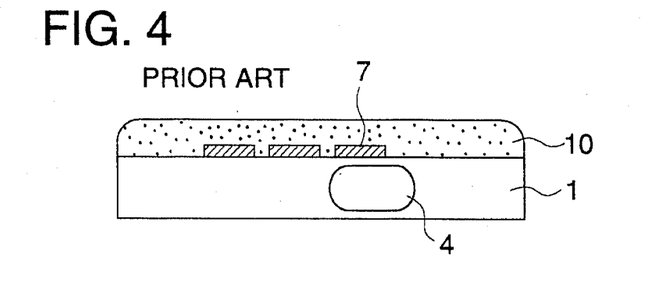
FIG. 4 is a sectional view of the conventional IC card.

Conventionally, an IC card shown in FIG. 4 is well known.

In FIG. 4, numeral 1 is a base board of a plastic card on which ICs are mounted. On a surface of the base board of this IC card, character and image information 7 such as an employee's number, name of the employee, date of issue and term of validity is recorded. This character and image information 7 is protected when a transparent sheet 10 is thermally pressed on the surface of the IC card. Japanese Patent Publication Open to Public Inspection No. 4480/1992 discloses the following technique: At a point of time when information is provided, the information is recorded on the surface of the card. Then the surface is coated with ultraviolet-ray-hardening type coating by which a transparent or translucent film is formed. In this way, information can be recorded on the IC card even after the card has been manufactured.

However, according to the conventional method, the quality of information recorded on a previously manufactured IC card is not competent. For example, concerning the surface condition of an IC card, there is a difference between a portion in which the ICs are mounted and a portion in which the ICs are not mounted, with respect to the hardness, heat conductivity, thermal shrinkage factor and the like. For this reason, after the IC card has been subjected to thermal press, irregularities and unevenness are caused on the surface of the IC card, which is not appropriate for recording information.

For example, even when the surface of the IC card is flat and smooth, excellent printing characteristics can not be provided because the surface is hard. Especially when information to be recorded is a piece of image information such as a portrait photograph having gradation properties, and when the information is recorded on the IC card by means of thermal transfer, problems are caused in the image reproduction.

From the viewpoint of preventing forgery, it is necessary to competently protect information recorded on the IC card. However, according to the conventional method in which a resin layer having thermal adhesion property is thermally transferred onto the IC card, information can not be competently protected. Accordingly, there is a possibility that information is subjected to forgery. The conventional method has the above problems.

SUMMARY OF THE INVENTION

It is an object of the present invention to provide an IC card, on the surface of which gradation information of high image quality is recorded. More particularly, it is an object of the present invention to provide an IC card having strongly protected gradation information of high image quality. Further, it is an object of the present invention to provide an IC card on which gradation information of high image quality can be recorded at high speed.

The above objects can be accomplished by the IC card of the present invention, the IC card, in which an IC (integrated circuit) chip is incorporated, comprises first and second base boards which are constructed so as to form the card; the IC chip incorporated between the first and second base boards; an image receiving layer on which an ink image is transferred by a thermal transfer method, the image receiving layer disposed on an outside of the first base board; and a cushion layer provided between the IC chip and the image receiving layer so that the cushion layer smooths irregularity caused by the IC chip and improves a flatness of the image receiving layer.

The above objects can be accomplished by the IC card of the present invention, which is composed of at least two base boards adhered to each other, at least one of the base boards including a cushion layer and an image receiving layer for receiving a sublimation or thermal diffusion pigment image by means of thermal transfer recording method in the order of image-receiving-layer/cushion-layer/base-board or in the order of image-receiving-layer/base-board/cushion-layer, wherein the image receiving layer is disposed on a distant side with respect to the other layer.

It is preferable that the aforementioned image is formed by means of thermal transfer, and it is more preferable that the thermal transfer image is formed by means of post-chelate type thermal transfer.

The above objects can be accomplished when an image formation surface is smoothed by a hard underlay layer of the present invention.

It is preferable that at least a portion of the card base board of the card is a polyester film of biaxial orientation having an image receiving layer on which an image is formed when it receives a thermal diffusion type pigment.

The above objects can be accomplished by an IC card on which ICs are mounted in a region except for the image forming region.

It is preferable that the IC is mounted on one side with respect to the long side direction, and the image region is provided on the other side. It is effective that an image in the image region is a gradation image.

It is preferable that the gradation image is formed by means of sublimation type thermal transfer, or alternatively the gradation image is formed by means of thermal transfer of thermal development.

It is preferable that these IC card are provided with a writing layer on the reverse side. It is preferable that an image receiving layer is provided on one side of the IC card, and a writing layer is provided on the other side of the IC card through a cushion layer.

It is preferable that an ultraviolet ray hardening resin layer is provided after an image has been formed on the image receiving layer of the IC card. It is also preferable that the above image is formed by means of sublimation thermal transfer. It is more preferable that an intermediate protective layer is formed after the image formation on the image receiving layer, and an ultraviolet hardening resin layer is provided on the intermediate protective layer.

According to the present invention, an image receiving layer for receiving a thermal transfer image is provided on a surface of the IC card base board, and a cushion layer is provided between the image receiving layer and the IC. Therefore, irregularities caused by the IC surface can be made smooth, so that the smoothness on the image receiving layer can be improved, and further the thermal head can be more closely contacted with the image receiving layer due to the resilience of the cushion layer. In this way, a transfer image of high quality can be formed. Further, when an ultraviolet hardening resin layer is formed on the surface of the image receiving layer, the image is strongly protected.

DETAILED DESCRIPTION OF THE INVENTION

The present invention will be explained in detail as follows.

The base board of the IC card of the present invention is necessarily provided with a CPU, memory, power source section, and writing and reading section which are necessary for forming an IC integrated circuit. As long as the above necessary elements are integrated on the IC card, the IC card of the present invention is not limited to a specific embodiment. Both the direct contact type writing and reading section and the non-contact type having communicating function may be applied. All IC cards of the prior art may be applied.

A formatized section may be previously printed on the surface of the IC card, or alternatively a white card having no printing section may be used.

Polyolefine is preferably used for the cushion layer of the present invention. Examples of usable materials are: polyethylene, polypropylene, ethylene-vinyl acetate copolymer, ethyl acrylate copolymer, styrene-butadiene-styrene block copolymer, styrene-isoprene-styrene block copolymer, styrene-ethylene-butadiene-styrene block copolymer, styrene-hydrogen added isoprene-styrene block copolymer, and polybutadiene. These materials are soft and the thermal conductivities are low.

The material to be used for the cushion layer is not limited to polyolefine, and it is preferable that the soften point of the cushion layer is lower than that of the card base board.

In view of the heat resistance property, it is preferable that the softening point (Vicar softening point) of the card base board is high. However, in view of the cushion property, it is preferable that the softening property of the cushion layer is lower than that of the card base board by 10 degrees or more than that. It is preferable that the cushion layer is provided all over the card surface, however, the cushion layer may be provided in such a manner that the IC and a portion of the electrically connected elements are covered with the cushion layer. It is preferable that the thickness of the cushion layer is 2 to 200 μm, and it is more preferable that the thickness of the cushion layer is 5 to 50 μm. In the case where the cushion layer is too thin, it does not function as a heat insulating layer. In the case where the cushion layer is too thick, the overall thickness of the card becomes too large, or alternatively the card is curled. The cushion layer is provided in the order of image-receiving-layer/cushion-layer/base-board, or in the order of image-receiving-layer/base-board/cushion-layer, wherein the image receiving layer is disposed on the distant side with respect to the other base board. It is preferable that the cushion layer is provided on both sides of the base board in such a manner that image-receiving-layer/cushion-layer/base-board/cushion-layer/IC/another-base-board.

In the present invention, the cushion layer is defined as a soft resin layer provided between the IC and the image receiving layer for receiving an image, so that the influence of irregularities caused by the electronic parts such as an IC module can be reduced by the cushion layer.

It is preferable that the soft resin layer is provided on one side or both sides of a base board having the IC, the material of which is substantially the same as that of the aforementioned base board, wherein the soft resin layer is provided by means of coating or adhesion.

In this case, the soft resin layer is defined as a resin layer, the tensile elastic modulus of which is lower than that of a base board of the same film thickness.

It is preferable that the tensile elastic modulus (ASTM D790) of the cushion layer is 20 to 200 kgf/mm$^{-2}$. It is also preferable that the tensile elastic modulus of the support (base board) is 210 to 1020 kgf/mm$^{-2}$.

Examples of usable resins for composing the image receiving layer are: polyvinyl chloride resin, polyester resin, polyvinyl acetal resin, polyvinyl butyral resin, polyepoxy resin, and acrylic resin.

The thermal transfer image forming method is preferably used. Either of the following thermal transfer methods is used: a method in which a thermal head is used for writing; a method in which an image is transferred by means of thermal transfer from an image sheet which has already been written; and a photographic image provided by means of thermal development.

It is preferable that the image information formed by thermal transfer is a gradation image such as a photographic image. It is more preferable that the image information formed by thermal transfer is a gradation image formed by a sublimation type thermal transfer pigment. It is preferable that the sublimation type thermal transfer pigment is a post-chelate type pigment by which a chelate can be formed in the image receiving layer.

The post-chelate type pigment capable of forming a chelate are disclosed in Japanese Patent Publication Open to Public Inspection Nos. 78893/1984, 109349/1984, 213303/1990, 214719/1990 and 203742/1990. Examples of usable pigments capable of forming at least two chelates are: a cyan pigment, magenta pigment, and yellow pigment.

In general, preferable post-chelate type pigments capable of forming a chelate are expressed by the following general expression.

General Expression X1–N=N–X2–G

In the expression, X1 denotes a carbon ring of aromatic compounds in which at one ring is composed of 5 to 7 atoms, or alternatively X1 denotes a group of atoms necessary for composing a heterocyclic ring, and at least one of the carbon atoms adjacent to the azo-bond carbon atoms is substituted by a nitrogen atom or a chelating group. X2 denotes an aromatic heterocyclic ring or an aromatic carbon ring, at least one ring of which is composed of 5 to 7 atoms. G denotes a chelating group.

It is preferable that the image receiving layer includes a thermally transferred post-chelate type pigment and a metallic compounds capable of being chelated.

Examples of metallic compounds capable of being chelated are inorganic or organic salt of metallic ions, and metallic complex. Salt of organic acid and complex are preferably used. Examples of usable metals are monoatomic and polyatomic metals belonging to the I to VIII groups in the periodic table. It is preferable to use Al, Co, Cr, Cu, Fe, Mg, Mn, Mo, Ni, Sn, Ti and Zn. It is more preferable to use Ni, Cu, Cr and Zn. Examples of metal source are: aliphatic salt made of one of $Ni^{2+}$, $Cu^{2+}$, $Cr^{2+}$, $Co^{2+}$ and $Zn^{2+}$, and acetic acid or stearic acid; and salt of aromatic carboxylic acid such as benzoic acid and salicylic acid.

The complex expressed by the following general expression is preferably used since it can be stably added to the image receiving layer and is substantially colorless.

General Expression $[M(Q1)_x(Q2)_y(Q3)_z]^{P+} \cdot (L^-)_p$

In the above expression, M denotes a metallic ion, and it is preferable that M is one of $Ni^{2+}$, $Cu^{2+}$, $Cr^{2+}$, $Co^{2+}$ and $Zn^{2+}$. Q1, Q2 and Q3 denote a coordinate compound capable of coordinate-bonding with a metallic ion represented by M. Q1, Q2 and Q3 may be the same of different from each other. For example, the coordinate compounds described in Chelate Science 5 (published by Nankodo Co.) may be used. L denotes an organic anoinic group. Specifically, tetraphenyl boron anion or alkylbenzensulfonic acid anion is used. In the above expression, x denotes an integer such as 1, 2 or 3, and y denotes 1, 2 or 0, and z denotes 1 or 0. The foregoing is determined by whether the complex expressed by the above general expression is 4-dentate coordination or 6-dentate coordination. Alternatively, the foregoing is determined by the number of coordination elements of Q1, Q2 and Q3. In the above expression, p denotes 1 or 2. The metal sources described above are described in United States Patent Publication No. 4,987,049.

In the image forming process, these post-chelate type pigments are easily transferred from the ink layer to the image receiving layer when a small amount of heat is given in the same manner as that of the sublimation type. In the image receiving layer, the post-chelate type pigment reacts with a metallic compound and changes to a chelate pigment. In this way, a stable and strong pigment having a high weather-proof property can be provided.

Examples of the material composing the hard underlay layer of the present invention are: a metallic sheet made of aluminum, copper or iron; a heat-resistant resin film made of biaxial orientation polycarbonate; biaxial orientation polyethylene terephthalate or a light-hardenable resin such as acrylic resin or epoxy resin; and a ceramic sheet.

In order to improve the surface smoothness property of the recording portion, it is preferable that the hard underlay layer is provided only in a portion which includes a thermal diffusion type pigment image.

It is preferable that the thickness of the hard underlay layer is 2 to 200 μm, and it is more preferable that the thickness of the hard underlay layer is 5 to 50 μm. In the case where the hard underlay layer is too thin, it does not function as a underlay layer. In the case where the hard underlay layer is too thick, the overall thickness of the card is increased. The hard underlay layer is composed in the order of image-receiving-layer/base-board/hard-underlay-layer/IC and/or an element electrically connected with IC.

In the present invention, the hard underlay layer is provided between the IC parts and the image receiving layer. By the action of the hard underlay layer, the influence of irregularities can be reduced in the time of forming an image on the IC card, and the electronic parts on the IC card can be protected from pressure and shock impressed from the outside when the IC card is used. In this case, the hard underlay layer is defined as an underlay layer, the tensile elastic modulus of which is higher than that of the base board when a comparison is made under the condition of the same film thickness.

Material of the hard underlay layer may be the same as that of the base board. The hard underlay layer is formed not on the overall surface of the card but on a partial surface of the card. It is preferable that the tensile elastic modulus is not less than 210 $kgf/mm^{-2}$.

The base board of a usual IC card is composed of an adhered vinyl chloride base body. However, in the case of the base board of the card of the present invention, it is preferable that at least a portion is made of biaxial orientation polyester film. It is preferable that the thickness of the biaxial orientation polyester film is 12 to 300 μm. It is more preferable that the thickness of the biaxial orientation polyester film is 25 to 250 μm. It is preferable that these layers include white pigment. Examples of usable white pigments are: titanium oxide, barium sulfate, and calcium carbonate. From the viewpoint of enhancing the insulating and cushion properties, it is more preferable to use a polyester film (the specific gravity is not more than 1.38) including a white pigment, wherein voids are formed when the material is subjected to biaxial orientation.

It is also preferable that the cushion layer contains the white pigment.

The IC portion can be formed and the IC can be mounted on the card by the conventional method in the following manner: The IC is fixed by a UV hardening resin. Alternatively, the upper and lower base boards are respectively cut out, and the IC is embedded in the cutout portion.

The most preferred embodiment of the base boards of the present invention is a three layer construction as shown in FIG. 1(a) in which an upper layer is a biaxial-orientation-polyester film, an inter layer having IC chip is a film made of vinyl chloride or ABS or polyester, a lower layer is a biaxial-orientation-polyester-film. As the upper and lower layers are composed of a biaxial orientation film, images of high quality can be formed, and further the image protective layer can be formed without the occurrence of curl.

A sublimation type or thermal diffusion type pigment image forming region is preferably formed in a portion except for the IC portion or in a portion except for a portion in which elements are electrically connected with the IC, so that even images can be formed. Therefore, the IC is preferably mounted in the following manner: The IC and/or the element section electrically connected with the IC are mounted on one side with respect to the long side, and the sublimation type or the thermal diffusion type pigment image region is provided on the other side.

It is preferable that an image receiving layer is provided on one side of the IC card of the present invention and a writing layer is provided on the reverse side. In order to enhance the writing property, the writing layer is provided on the surface of the base board of the IC card through the cushion layer described before. In order to enhance the writing and recording properties, minute irregularities are formed on the surface of the writing layer.

After an image has been formed on the image forming layer of the IC card, it is preferable that an intermediate protective layer is formed on the image forming layer and that an ultraviolet ray hardening resin layer is provided on the intermediate protective layer. The reason why the intermediate protective layer is provided will be described below: By the action of ultraviolet ray hardening prepolymer and monomer included in the ultraviolet ray hardening protective layer described later, an image containing gradation information formed by the sublimation type pigment is blurred and the color is changed. These problems can be solved when the intermediate protective layer is provided. In order to effectively prevent the sublimation type pigment from being denatured when ultraviolet rays are irradiated in the case where the ultraviolet ray hardening protective layer is formed, it is effective to provide the intermediate protective layer. It is considered that the sublimation type pigment is denatured by the dissolution of the pigment when it is irradiated with active ultraviolet rays, and also the pigment is denatured when it reacts with other substances.

Characteristics of this intermediate protective layer are described as follows: An adhesive force between the ultraviolet ray hardening protective layer and this intermediate layer, or an adhesive force between the image receiving layer and this intermediate layer is relatively higher than an adhesive force of the interface of the image receiving layer on which a transfer image is not formed; the intermediate protective layer is substantially transparent; the intermediate protective layer is capable of reducing the interference of ultraviolet rays with respect to the sublimation type pigment; and the ultraviolet ray hardening resin solution is not contacted with the sublimation type pigment in the case where the ultraviolet ray hardening resin solution is coated.

Concerning the region in which this intermediate protective layer is formed, the intermediate protective layer may be formed only in a region in which image information has been formed on the image receiving layer, or alternatively the intermediate protective layer may be formed all over the image receiving layer. This intermediate protective layer can be formed on the image recording body by means of thermal transfer in which a hot stamp or a thermal head is used.

The intermediate protective layer meeting the demands described above can be formed by the thermal fusion type compounds described in Japanese Patent Publication Open to Public Inspection No. 183881/1988 from the ninth line in the left lower column on the ninth page to the fifteenth line in the left upper column on the tenth page, and also by the thermoplastic resins described in Japanese Patent Publication Open to Public Inspection No. 183881/1988 from the sixteenth line in the left upper column on the tenth page to the ninth line in the left lower column on the eleventh page.

The intermediate protective layer may include an ultraviolet ray absorbing agent.

The ultraviolet ray absorbing agent is effective for absorbing ultraviolet rays in the case where a hardening resin solution including ultraviolet ray hardening prepolymer is irradiated with ultraviolet rays so as to be hardened. Also the ultraviolet ray absorbing agent is effective for protecting image information from sunlight in the case where the IC card is preserved over a long period of time.

In some cases, it is difficult to add the ultraviolet ray absorbing agent to the ultraviolet ray hardening resin layer, because the ultraviolet ray absorbing agent obstructs the hardening of the ultraviolet ray hardening resin. Accordingly, it is effective to add the ultraviolet ray absorbing agent to the intermediate protective layer. Compounds exemplified in the explanation of the image receiving layer can be used for the ultraviolet ray absorbing agent. Although an addition amount of the ultraviolet ray absorbing agent depends on the type of the agent, it is preferable to add the ultraviolet ray absorbing agent by an amount not less than 0.6 g/m$^2$, and more preferably not less than 1 g/m$^2$.

While consideration is given to the uniform coating property of the ultraviolet ray hardening protective layer, it is preferable that the thickness of the intermediate protective layer is 0.5 to 20.0 μm and more preferably 1.0 to 10.0 μm. Further, it is preferable that a resin layer hardened by ultraviolet rays is provided on the intermediate protective layer. This resin layer is effective for retaining information formed on the IC card over a long period of time. In the case where this protective layer is forcibly peeled off, the image information formed on the card is damaged. Therefore, this resin layer is effective for preventing forgery of the IC card.

Concerning the primary composition of the ultraviolet ray hardening resin, the ultraviolet ray hardening prepolymer and/or monomer and polymerization starting agent are used.

Concerning the ultraviolet ray hardening type prepolymer and monomer, there are provided a type of radical polymerization (acrylate type) and a type of cationic polymerization (epoxy type). Either of the types can be applied to the present invention. In this specification, the epoxy type of ultraviolet ray hardening prepolymer and monomer are described. An example of the epoxy type prepolymer and monomer is a prepolymer having not less than 2 epoxy groups in one molecule. Examples of the usable prepolymers are: alicyclic polyepoxide, polybasic polyglycidyl ester, polyhydric alcohol polyglycidyl ether, polyglycidyl ether of polyoxyalkyleneglycol, polyglycidyl ether of aromatic polyol, hydrogen added compound of polyglycidyl ether of aromatic polyol, compound of urethane polyepoxy, and epoxidized polybutadiene. These prepolymers can be used alone, or two or more may be mixed. It is preferable that the content of prepolymer having not less than 2 epoxy groups in one molecule is not less than 70 weight %, wherein the prepolymer is included in the coating agent for forming an ultraviolet ray protective layer.

A cationic polymerization starting agent is preferably used for the aforementioned polymerization starting agent. Specifically, aromatic onium salt is preferably used. Examples of usable aromatic onium salt are: salt of the elements of the Va group in the periodic table such as phosphonium slat (for example, triphenylphenacylphosphonium hexafluorosilicate); salt of the elements of the VIa group in the periodic table such as sulfonium salt (for example, triphenylsulfonium tetrafluoroboronate, triphenylsulfonium hexafluorophosphate, tris hexafluorophosphate, sulfonium, and triphenylsulfonium hexafluoroantimonate); and salt of the elements of the VIIa group such as iodonium salt (for example, diphenyliodonium chloride).

United Stakes Patent Publication Nos. 4,058,401, 4,069,055, 4,101,513 and 4,161,478 disclose the technique in which aromatic onium salt is used for the cationic polymerization starting agent in the polymerization of epoxy compounds.

Sulfonium salt of the elements of the VIa group is preferably used for the cationic polymerization starting agent. From the viewpoint of ultraviolet ray hardening property and preservation property of the ultraviolet ray hardening components, triarylsulfonium hexafluoroantimonate is preferably applied.

Oil (silicon oil), surface active agent such as siliconalkylene oxide copolymer (for example, L-5410 manufactured by Union Carbide Co.), aliphatic epoxide including silicon oil, fluorocarbon surface active agent such as FO-171 manufactured by 3M Co., FO-430 manufactured by 3M, and Megafac F-141 manufactured by Dainihon Ink Co. may be included in the ultraviolet ray hardening protective layer coating. The ultraviolet ray hardening protective layer coating agent may include a vinyl monomer such as styrene, paramethly styrene, eater methacrylate and ester acrylate.

Also, the ultraviolet ray hardening protective layer coating agent may include monoepoxide such as cellulose, thermoplastic polyester, phenylglycidyl ether, monoepoxide including silicon, and butylglycidyl ether. When they are added, the added amount should be limited so that they do not deteriorate the effect of the invention. As an inactive component, the following may be added to this ultraviolet ray hardening protective layer coating agent: dye, pigment, thickener, plasticizer, stabilizer, leveling agent, coupling agent, tackifier, activator including silicon groups, surface active agent including fluorocarbon groups, and other additive agents. For the purpose of improving the fluidity of the coating agent, a small amount of solvent such as acetone, methyl ethyl ketone and methyl chloride may be included, which seldom react with the cationic polymerization starting agent.

In the ultraviolet ray hardening, ultraviolet rays are defined as rays of light in the region of ultraviolet. Irradiation of ultraviolet rays is conducted by the sun, mercury lamp of low voltage, mercury lamp of high voltage, mercury lamp of ultrahigh voltage, carbon arc, metal halide lamp, and xenon lamp. When necessary, an electron beam of high energy may be used.

When a coating film of the coating agent for the ultraviolet ray hardening protective layer is heated in the process of the irradiation of ultraviolet rays, or before and after the irradiation of ultraviolet rays, it is possible to reduce the hardening time.

Manufacture of the IC card

The IC card of the present invention can be manufactured as follows.

For example, as illustrated in FIG. 1(a), the intermediate layer onto which the IC is assembled and the upper and lower layers are adhered upon the base board, so that the IC card base board is formed. On the IC card base board constructed in this manner, polyolefine is coated using a coater head, and the coated layer is dried so as to form a cushion layer. On the cushion layer, polyvinyl chloride resin is coated and dried. In this way, the image receiving layer is formed, and the IC card of the present invention is provided.

An image including gradation information is formed in the following manner: An image receiving layer on the IC card, and an ink layer on the ink sheet for sublimation type thermal transfer recording are put upon. Then heat is given by a heat source such as a thermal head, so that the thermal diffusion type pigment is diffused into the image receiving layer.

After that, when necessary, various characters are thermally transferred onto the image receiving layer surface on which the image including gradation information has not been formed, by the thermally fusion type thermal transfer recording system in which a thermally fusion type ink sheet is used. On the surface of the image receiving layer on which the image including gradation information has been formed, a transparent protective layer is formed by a coating method, a hot stamp method in which a transparent transfer foil sheet is used, or a thermal transfer method in which a thermal head is used. After that, ultraviolet ray hardening resin is coated all over the image receiving layer and irradiated with ultraviolet rays so that the ultraviolet ray hardening resin layer is formed.

The aforementioned sublimation type thermal transfer recording sheet is not limited to a specific one. Therefore, the conventional sublimation type thermal transfer recording sheet can be applied.

The thus obtained IC card is appropriate for mass production. As a hard transparent ultraviolet ray hardening resin layer is provided on the surface, durability of the IC card is high. Further, forgery of the IC card can be prevented in the following manner. Even when an attempt is made to separate the hard protective layer from the image receiving layer on which an image has been transferred, other interfaces, the adhesive force of which is relatively low, are peeled off, and the interface between the image receiving layer and the hard protective layer is not peeled off easily. Therefore, forgery of the IC card can be effectively prevented.

With reference to an example, layer construction of IC card according to the present invention will be specifically explained as follows. However, it should be noted that the present invention is not limited to the specific example.

EXAMPLE 1

Figure 1:
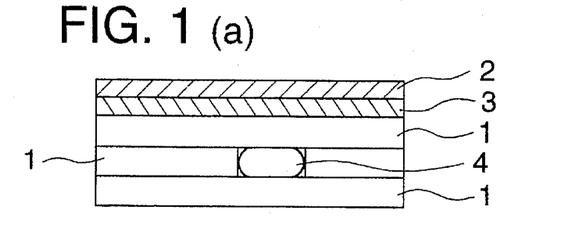
FIGS. 1(a) to 1(e) are sectional views of the IC card of the present invention.

FIG. 1 is a sectional view of the IC card composed in such a manner that an image information receiving layer is provided on a base board of the invention on which an IC is mounted, through a cushion layer. As illustrated in FIG. 1(a), the IC 4 is mounted on the IC base board 1 composed of three layers. On the surface of the IC base board 1, there is provided an image receiving layer 2 through a cushion layer 3. FIG. 1(b) shows an IC base board, the reverse surface of which is provided with a writing layer 5. In this case, a cushion layer may be provided between the writing layer and the IC base board. FIG. 1(e) shows an example in which the cushion layer 3 is formed between the layers of the IC base board, wherein the IC base board is composed of three layers. In the example shown in FIG. 1(c), the writing layer 5 is formed on the reverse side of the IC base board shown in FIG. 1(e). In the example shown in FIG. 1(d), the base board is composed of three layers, and the cushion layers 3 are provided between the base boards 1, between the base board 1 and the image receiving layer 2, and between the writing layer 5 and the base board 1.

EXAMPLE 2

Figures 2A, 2B:
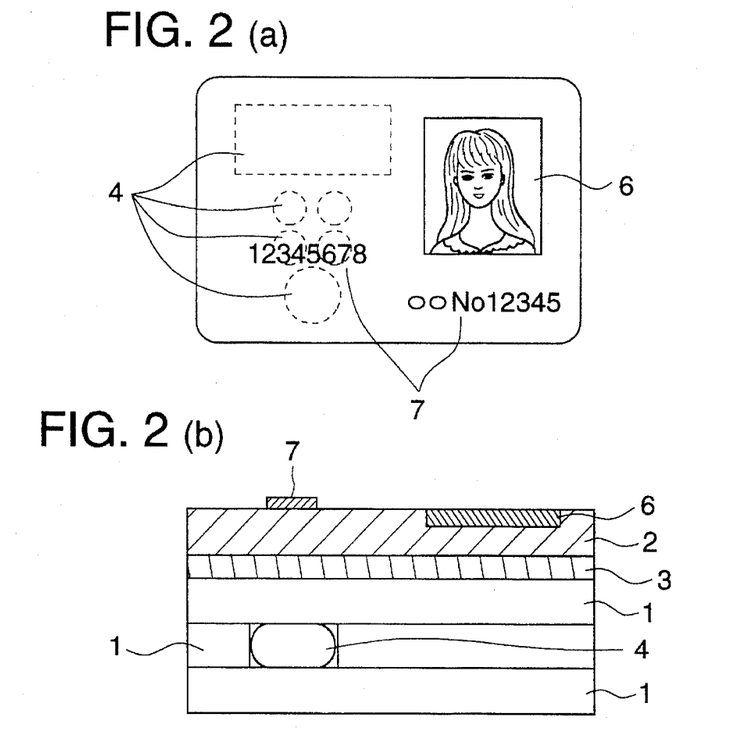
FIG. 2(a) is a plan view of the IC card of the present invention.
FIG. 2(b) is a sectional view of the IC card of the present invention.

FIG. 2(a) is a plan view showing an example of the IC card in which the ICs are provided in a portion except for the gradation image forming region. As illustrated in the drawing, the ICs 4 are concentrated on one side of the base board 1 with respect to the long side direction. Gradation image information 6 is recorded on the surface of the other side where the IC are not provided. Further, character image information 7 is recorded on the surface.

In the example shown in FIG. 2(b), a cushion layer was provided between the IC 4 and the image receiving layer, and the gradation image 6 and the character image 7 were formed on the image receiving layer in the same arrangement as that shown in FIG. 2(a). Since the cushion layer was provided, no distortion was observed on the character image 7 transferred onto the IC 4.

EXAMPLE 3

Figure 3:
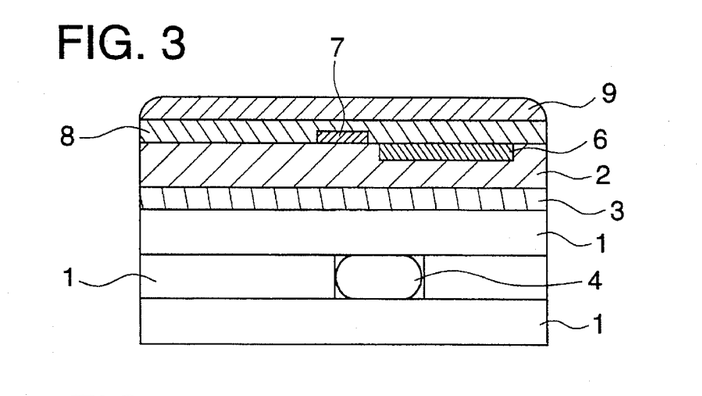
FIG. 3 is a sectional view of the IC card of the present invention.

FIG. 3 is a sectional view of the IC card composed in the following manner: After an image forming layer has been formed on the IC card, an intermediate layer is formed and an ultraviolet ray hardening layer is provided on the intermediate layer.

In the drawing, gradation image information 6 is fixed on the image receiving layer 2 as a chelate pigment by means of thermal transfer of a sublimation pigment. Character image information 7 is formed on the image receiving layer surface by means of thermal transfer. After these image have been formed, an intermediate protective layer 8 is formed on the surface, and an ultraviolet ray hardening resin layer 9 is provided on the surface of the intermediate protective layer 8.

When a cushion layer is provided between the IC card base board and the image receiving layer, gradation image information 6 can be formed in a good condition.

EXAMPLE 4

FIG. 1(*d*) shows a specific layer construction of this invention.

The intermediate base board layer of the IC base board 1 is made of polyvinyl chloride resin, and its thickness is 250 µm. Cushion layers 3 made of polypropylene resin are provided on both sides of the intermediate base board layer, wherein the thickness of the cushion layer 3 is 50 µm. Further, on both sides, upper and lower base board layers base boards 1 made of polyethylene terephthalate, the thickness of which is 150 µm, are provided. Further, on both sides, cushion layers 3 made of polypropylene resin, the thickness of which is 50 µm, are provided. On one outer surface, an image receiving layer 2 made of polyvinyl butyral is provided, and on the other outer surface, a writing layer 5 is formed.

|  | Tensile elastic modulus |
| --- | --- |
| Polyvinyl chloride | 280 kgf/mm$^{-2}$ |
| Polypropylene | 130 kgf/mm$^{-2}$ |
| PET | 300 kgf/mm$^{-2}$ |

EXAMPLE 5

Figure 5:
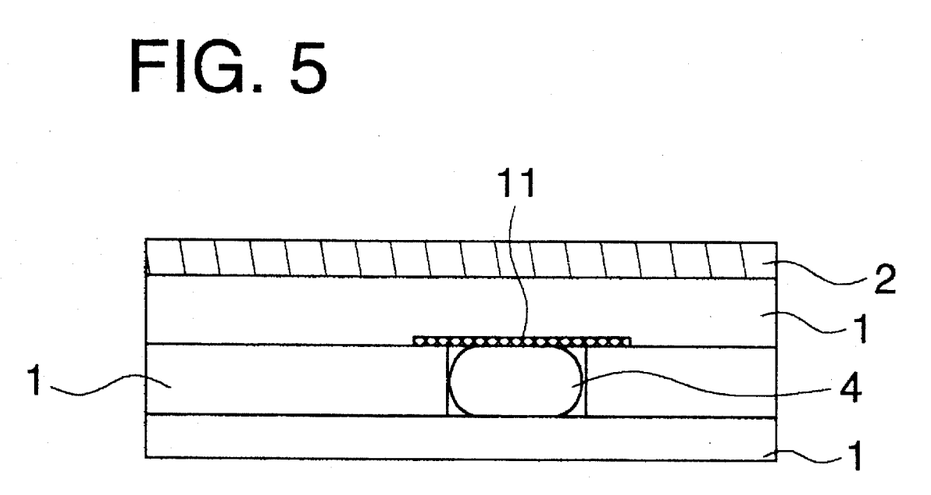
FIG. 5 is a sectional view of the IC card of the present invention.

FIG. 5 is a sectional view showing an example in which an underlay layer of the present invention is provided in the IC base board.

In this example, an underlay layer 11 made of an aluminum sheet (tensile elastic modulus >300 kgf/mm$^{-2}$) is provided at a position on the IC base board where the IC is mounted. The underlay layer 11 is thermally fused to the base board, and an image receiving layer 2 is formed on the surface.

According to the aforementioned procedure of manufacturing the IC card, the IC card of the present invention shown in FIG. 1(*a*) was prepared. On the other hand, the process for making the cushion layer was omitted in the aforementioned manufacturing procedure, so that an IC card of the comparative example was prepared, in which the cushion layer was omitted (shown in FIG. 5). All other points were the same as those of the IC card of the present invention when all features of FIGS. 3 to 5, not specifically indicated, are the same as defined in FIGS. 1(*a*) to 1(*e*) and FIGS. 2(*a*) and 2(*b*).

Then a thermal dispersion type pigment was dispersed on the image receiving layer in the following manner: The image receiving layer on the IC card was put on a sublimation type heat sensitive ink sheet for transfer recording. Then, the image receiving layer and the ink sheet were heated by a thermal head in the same manner as the gradation image 6 shown in FIG. 2. In this way, the thermal dispersion type pigment was dispersed on the image receiving layer.

On the gradation image 6 formed on the IC card of the comparative example, a distortion of the image was observed which was caused by the irregularities on the image forming layer originated from the IC.

On the other hand, no distortion was observed on the gradation image 6 formed on the IC card of the present invention, and the quality of the gradation image 6 was high. The reason why the image of high quality was formed will be described below. The IC card of the present invention is provided with a cushion layer between the image receiving layer and the IC. By the cushion layer, irregularities caused by the IC were made smooth, so that the image receiving layer was made flat, and further the thermal head was more closely contacted with the image receiving layer by the action of resilience of the cushion layer.

The most preferable embodiment of the IC card having a portrait image and characters of the present invention is provided in such a manner that the portrait image is formed by means of thermal transfer of sublimation type or thermal diffusion type, and the characters are formed by means of melting type thermal transfer. In the case where the image is recorded approximately all over the surface of the card, it is especially preferable that the electronic parts such as an IC module are provided in a portion except for the portrait image, and the character image is formed in a portion on the electronic parts. The following has been found in an experiment made by the inventors: In the case where the electronic parts are provided below the portrait image (sublimation image) which is a gradation image, unevenness of the portrait image tends to be caused being influenced by the electronic parts. Therefore, a thick cushion layer or underlay layer is required to avoid the unevenness. On the other hand, with respect to the character image (melted image), when a cushion layer or an underlay layer, the thickness of which is not less than 5 µm and not more than 100 µm, is provided, even character images can be formed.

When an image receiving layer is provided on a base board on which the ICs are mounted, through a cushion layer, an IC card is provided, on which a transfer image of high quality can be formed.

What is claimed is:

1. A card in which an IC (integrated circuit) chip is incorporated, said card comprising:

a first base board and second base board constructed to form said card, said first base board having a Vicat Softening Point (°C.);

an IC chip incorporated between said first base board and said second base board;

an image receiving layer onto which an ink image is transferred from an ink supply sheet by a thermal transfer method, said image receiving layer being disposed on an outside of said first base board; and a cushion layer provided between said IC chip and said image receiving layer whereby said cushion layer smooths irregularities caused by said IC chip and improves a flatness of said image receiving layer, a softening point of said cushion layer being at least 10° C. lower than that of said first base board, whereby said cushion layer is softer than said first base board.

2. The card of claim 1, wherein the cushion layer is disposed between the first base board and the image receiving layer.

3. The card of claim 1, wherein the cushion layer is disposed between the IC chip and the first base board.

4. The card of claim 1, wherein the cushion layer is polyolefine.

5. The card of claim 1, wherein the cushion layer has a thickness of 2 to 200 µm.

6. The card of claim 1, wherein the cushion layer has a thickness of 5 to 50 µm.

7. The card of claim 1, wherein the base board is made of biaxial orientation polyester film.

8. The card of claim 1, wherein the IC chip is located on one section of the card and the ink image is transferred on the other section of the card.

9. The card of claim 1, wherein the ink image is a halftone image.

10. The card of claim 1, wherein a writing layer on which information is written is provided on an outside of the second base board.

11. The card of claim 1, wherein a hard overlay layer to smooth irregularity caused by the IC chip is provided between the base board and the IC chip.

12. The card of claim 1, wherein, after the ink image is transferred on the image receiving layer, an intermediate protective layer is provided on the ink layer and an ultraviolet ray hardening layer is provided on the protective layer.

13. The card of claim 1, wherein the base boards and the cushion layer contain a white pigment.

14. A card in which an IC (integrated circuit) chip is incorporated, said card comprising:

a first base board and a second base board constructed to form said card, said first base board and said second base board having a tensile elastic modulus (ASTM D790) of 210 kgf mm$^{-2}$ to 1020 kgm mm$^{-2}$;

an IC chip incorporated between said first base board and said second base board;

an image receiving layer onto which an ink image is transferred from an ink supply sheet by a thermal transfer method, said image receiving layer being disposed on an outside of said first base board; and a cushion layer provided between said IC chip and said image receiving layer, said cushion layer having a tensile elastic modulus of 20 kgf mm$^{-2}$ to 200 kgf mm$^{-2}$, whereby said cushion layer is softer than said first base board, thereby smoothing irregularities caused by said IC chip and improving a flatness of said image receiving layer.

* * * * *